United States Patent [19]

Banavar et al.

[11] Patent Number: 4,855,912

[45] Date of Patent: Aug. 8, 1989

[54] METHOD AND APPARATUS FOR MEASUREMENT OF THE THERMAL BEHAVIOR OF POROUS MEDIA

[75] Inventors: Jayanth R. Banavar, Ridgefield; David L. Johnson, Danbury, both of Conn.; Sidney R. Nagel, Chicago, Ill.; Kambiz A. Safinya, Ridgefield, Conn.

[73] Assignee: Schlumberger Technology Corp., New York, N.Y.

[21] Appl. No.: 153,130

[22] Filed: Feb. 8, 1988

[51] Int. Cl.$^4$ .................. G01V 3/20; G01V 3/30; G01V 9/00

[52] U.S. Cl. ........................ 364/422; 73/154; 324/323; 324/355

[58] Field of Search ........... 324/338, 355, 323, 360; 364/422; 73/38, 154; 166/65.1, 66

[56] References Cited

U.S. PATENT DOCUMENTS

| | | | |
|---|---|---|---|
| 2,141,826 | 12/1938 | Schlumberger | 324/366 |
| 2,366,694 | 11/1941 | Bender | 324/324 |
| 3,164,988 | 1/1965 | Cook | 324/323 |
| 3,805,587 | 4/1974 | Sayer | 324/355 |
| 4,140,179 | 2/1979 | Kasevich et al. | 166/65.1 |
| 4,469,451 | 9/1984 | Kunetka et al. | 324/338 |
| 4,510,437 | 4/1985 | Iskander | 324/61 R |
| 4,573,805 | 3/1986 | Savage et al. | 374/186 |
| 4,626,773 | 12/1986 | Kroeger et al. | 324/337 |

OTHER PUBLICATIONS

D. L. Johnson et al., "New Pore-Size Parameter Characterizing Transport in Porous Media", Physical Review Letters, vol. 57, No. 20, Nov., 1986.

J. R. Banavar et al., "Characteristic Pore Sizes and Transport in Porous Media", Physical Review B, vol. 25, No. 13, May, 1987.

C. Straley et al., "Magnetic Resonance, Digital Image Analysis, and Permeability of Porous Media", Appl. Phys. Lett. 51, Oct., 1987.

E. Matatagui et al., "Thermoreflectance in Semiconductors", Physical Review, vol. 176, No. 3, Dec., 1968.

N. O. Birge et al., "Specific-Heat Spectroscopy of the Glass Transition", vol. 54, No. 25, Physical Review Letters, Jun. 1985.

D. L. Johnson et al., "Theory of Dynamic Permeability and Tortuosity in Fluid-Saturated Porous Media", J. Fluid Mech. (1987), vol. 176, pp. 379–402.

D. J. Bergman, "The Dielectric Constant of a Simple Cubic Array of Identical Spheres", Solid State Phys., vol. 12, 1979.

Primary Examiner—Jerry Smith
Assistant Examiner—David M. Huntley
Attorney, Agent, or Firm—Keith Smith; Peter Lee; Martin Novack

[57] ABSTRACT

A method and apparatus for investigating earth formations surrounding a borehole operates by selectively heating a region of the formations, and measuring the thermal response to obtain useful information concerning the characteristic length scales of the pores in the heated region. The thermal response is obtained indirectly by measuring the electrical conductivity response. The invention can be utilized to obtain, inter alia, indications of porosity, permeability, and the distribution of pore geometries. In accordance with an embodiment of the method of the invention, the following steps are performed: heating a region of the formations with a series of pulses of microwave electromagnetic energy; measuring the conductivity characteristic of the region which result from the heating pulses; and determining a property of the region of the formations from the measured conductivity characteristic. In the preferred embodiment of the invention, the conductivity characteristic is converted to conductivity as a function of frequency, and the desired property is determined from the conductivity as a function of frequency. The disclosed technique can also be used for studying the microgeometry of media such as core samples.

39 Claims, 6 Drawing Sheets

METHOD AND APPARATUS FOR MEASUREMENT OF THE THERMAL BEHAVIOR OF POROUS MEDIA

BACKGROUND OF THE INVENTION

This invention relates to the measurement of the thermal behavior of materials, and, more particularly, to a method and apparatus which uses measurement of the thermal behavior for determination of the microgeometry of porous media such as rocks. An important form of the invention is the logging of earth formations surrounding a borehole.

The determination of the microgeometrical structure of porous media, such as rocks and other naturally occurring materials, poses various difficulties, including the fact that many different length scales are typically involved. Neutron diffraction can probe a material from atomic dimensions up to several Angstroms. For much larger structure, on the order of 1 mm, magnetic resonance can be used. However, for the intermediate length scales, there is no satisfactory method for non-destructive determination of pore geometry information. This limitation is particularly noteworthy in that it is these length scales, around 1 micrometer, which are important for determination of physical properties such as fluid flow through a material in question.

The difficulties associated with non-destructive measurement of the pore characteristics of media are, of course, exacerbated when one needs to measure materials in an in situ environment like an earth borehole. The determination of permeability and other parameters which depend upon the microgeometry of formations, is very useful in gauging the hydrocarbon producibility of the formations. However, existing techniques for measuring permeability and related parameters in a borehole have various drawbacks. So-called "direct" measurement techniques involve measurement of fluid flow, pressure, etc. in the formations, and require logging tools which inject and/or extract fluids to and/or from the formations. This technique generally involves measurement devices with moving parts which have limited reliability, operating speed, and data acquisition capabilities. In so-called "indirect" methods, permeability is determined from empirical correlations which attempt to express permeability in terms of other measured formation parameters, for example porosity and saturation. These techniques can have limited accuracy in various situations.

It is among the objects of the present invention to provide a method and apparatus for determining microgeometrical properties of materials using non-destructive investigation. While this objective extends to measurement of materials in any environment, it is a particularly important object to devise such a technique which can be employed in well logging applications for investigation of earth formations surrounding a borehole.

SUMMARY OF THE INVENTION

A form of the present invention is directed to a method and apparatus for investigating earth formations surrounding a borehole by selectively heating a region of the formations, and measuring the thermal response to obtain useful information concerning the characteristic length scales of the pores in the heated region. The thermal response is obtained indirectly by measuring the electrical conductivity response. The invention can be utilized to obtain, inter alia, indications of porosity, permeability, and the distribution of pore geometries.

In accordance with an embodiment of the method of the invention, the following steps are performed: heating a region of the formations with a series of pulses of microwave electromagnetic energy; measuring the conductivity characteristic of the region which results from the heating pulses; and determining a property of the region of the formations from the measured conductivity characteristic. In the preferred embodiment of the invention, the conductivity characteristic is converted to conductivity as a function of frequency, and the desired property is determined from the conductivity as a function of frequency. [In the present application, any references to determination or use of resistivity are intended to generically mean conductivity as well, and vice versa. These quantities are reciprocals, and mention of one or the other herein is for convenience of description, and not intended in a limiting sense.]

The water temperature of a formation can be varied at a frequency $\omega$ by radiating the medium with microwave energy that is power modulated at a frequency $\omega$. The microwave energy will we preferentially absorbed by the water, rather than the matrix material. The conductivity of the water is temperature-dependent, so the water conductivity will also vary at frequency $\omega$. If the thermal wavelength is very small compared to the size of the pores in the medium, then the water temperature in the pores will oscillate with a relatively large amplitude, since the heat does not have a change to escape the pores in the oscillation time period. There will then be a corresponding relatively large signal at frequency $\omega$ for the measured conductivity. If, on the other hand, $\omega$ is relatively small, so that the thermal wavelength is much larger than the pore sizes, then the temperature rise will be smaller and the conductivity measured at frequency $\omega$ will be smaller as well. As the modulation frequency of the microwave power is varied so that the thermal wavelength is varied from a size smaller than the characteristic dimension of a pore, d, to a size larger than d, the conductivity oscillations at frequency $\omega$ will also vary. The largest variation can be expected to occur at the frequency where the thermal wavelength approximately equals d. In a form of the present invention, the distribution of pore sizes is determined by measuring how the conductivity oscillations vary as a function of the power modulation frequency of the microwave energy. In an embodiment hereof, pulses of microwave energy are utilized, and a Fast Fourier Transform is employed to convert a measured conductivity response from the time domain to the frequency domain. The resultant response in the frequency domain yields useful information about the formation microgeometry.

Further features and advantages of the invention will become more readily apparent from the following detailed description when taken in conjunction with the accompanying drawings.

BRIEF DESCRIPTION OF THE DRAWINGS

FIG. 3, which includes graphs 3A-3E, illustrates waveforms associated with the circuitry of the embodiment set forth.

DESCRIPTION OF THE PREFERRED EMBODIMENT

Figure 1:
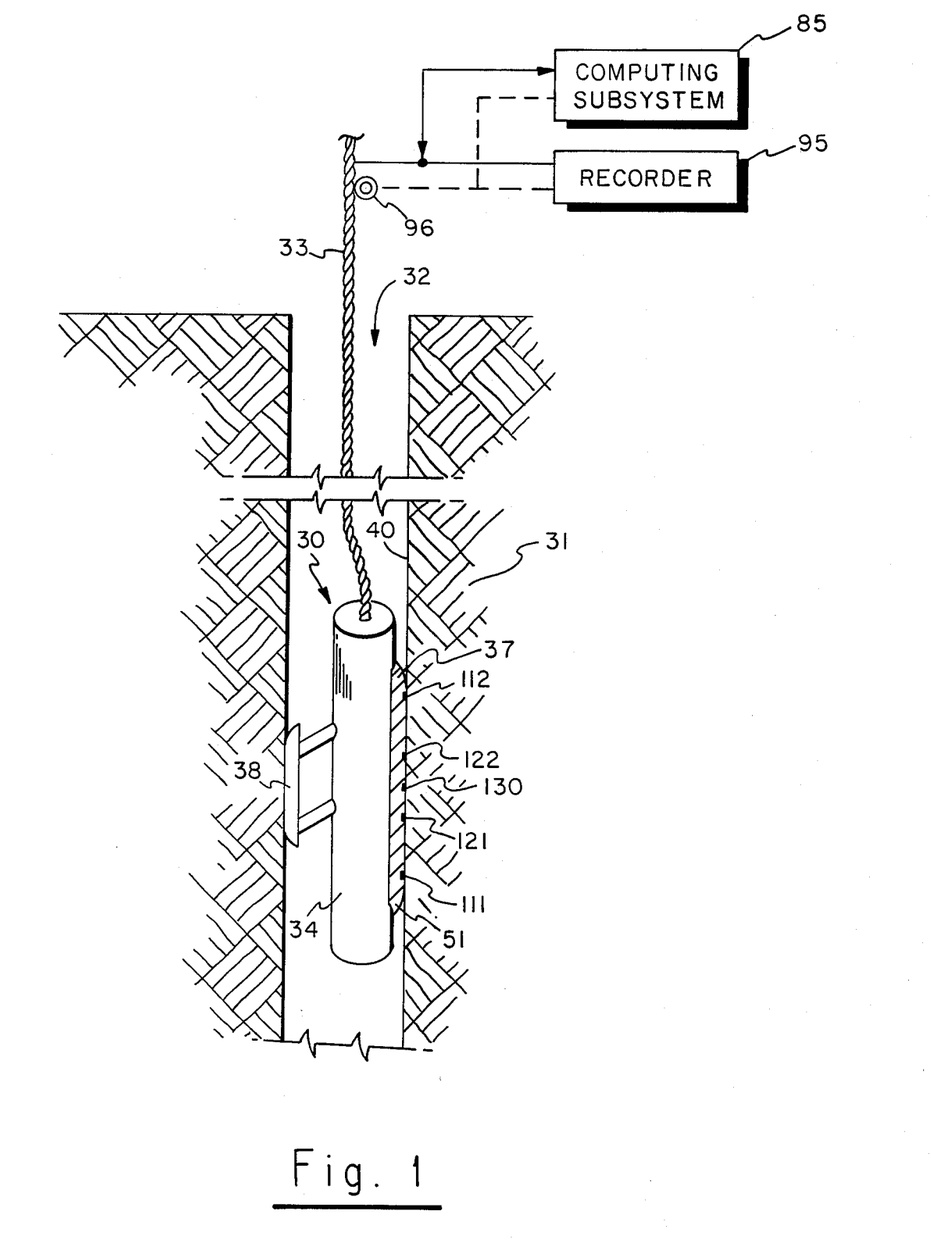
FIG. 1 is a schematic representation, partially in block diagram form, of an apparatus in accordance with an embodiment of the invention, and which can be used to practice the method of the invention.

Referring to FIG. 1, there is shown an embodiment of an apparatus 30 in accordance with an embodiment of the invention for investigating subsurface formations 31 traversed by a borehole 32. The borehole 32 is typically, although not necessarily, filled with a drilling fluid or mud and will have a mudcake 40 formed on the walls of the borehole.

The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The logging device 30 includes an elongated cylindrical sonde 34, the interior portion of which has a fluid-tight housing containing the bulk of the downhole electronics. Mounted on one side of sonde 34 is a skid 37 which contains an antenna and electrodes to be described. On the other side of sonde 34 is mounted a backup arm 38 which may be hydraulically controlled to maintain the skid 37 in contact with the borehole wall. The backup arm 38 can also be used to provide a caliper reading. Electronic signals indicative of the information obtained by the logging device can be conventionally transmitted through the cable 33 to a computing sybsystem 85 and a recorder 95, typically located at the surface of the earth. The particular means shown in FIG. 1 for maintaining the skid in engagement with the borehole wall is illustrative, and it will be appreciated that other known suitable means for accomplishing this objective cn be utilized.

Figure 2:
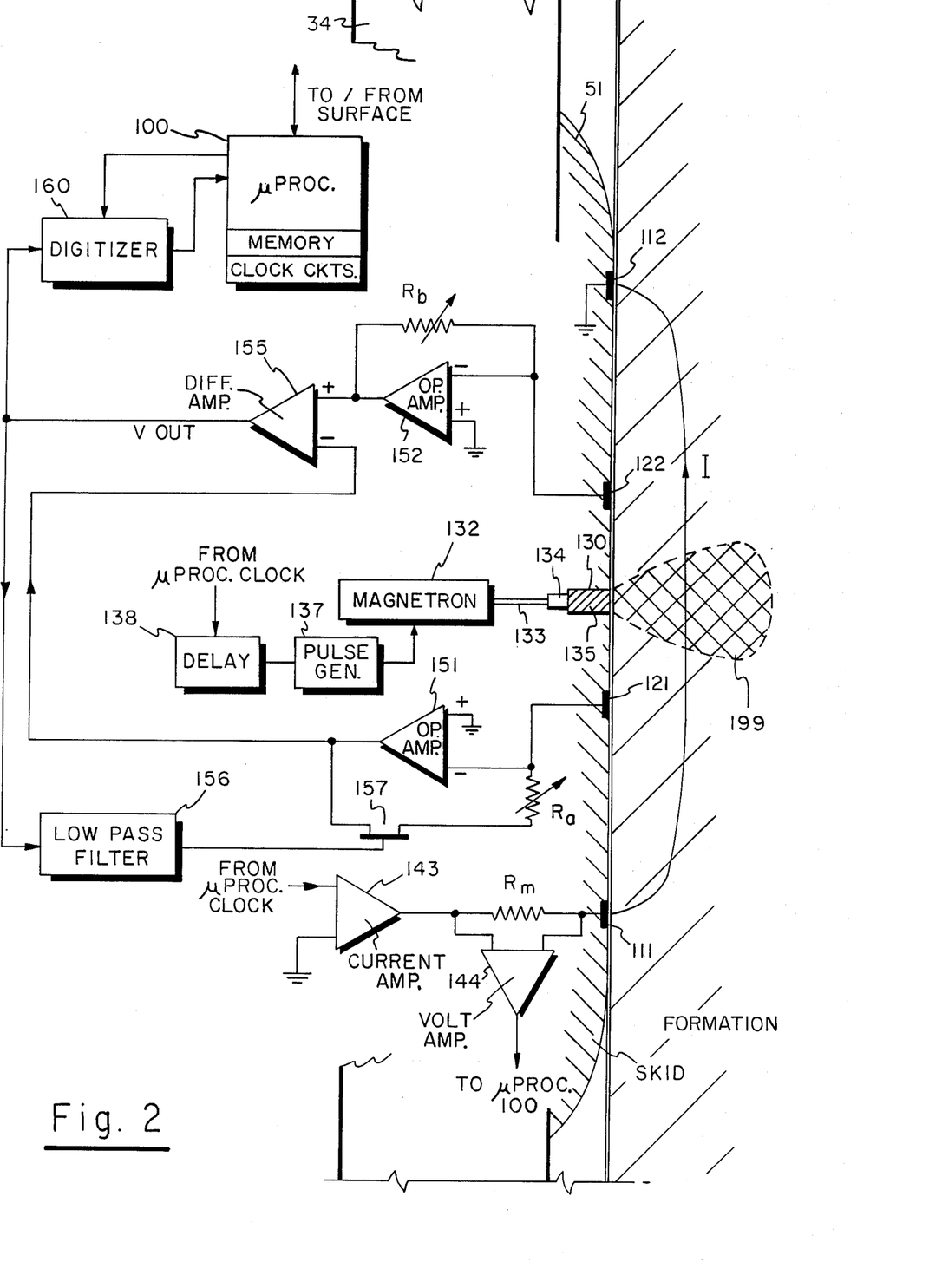
FIG. 2 is a schematic diagram, partially in block form, of a portion of the measurement apparatus and circuitry of the FIG. 1 embodiment.
Figure 3A:
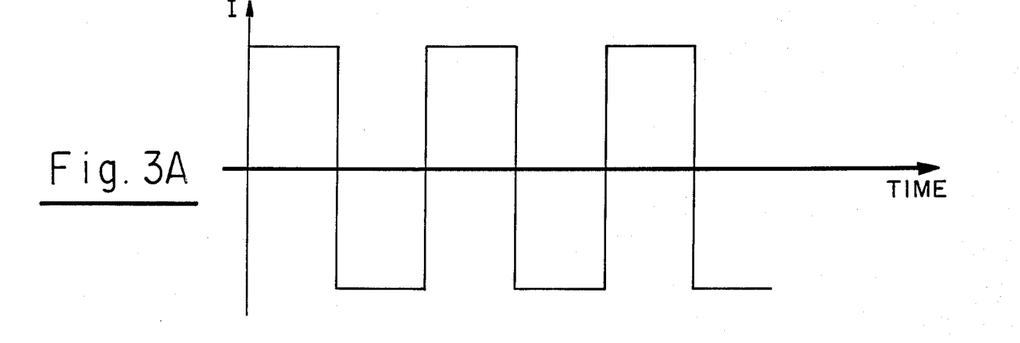
Figure 3B:
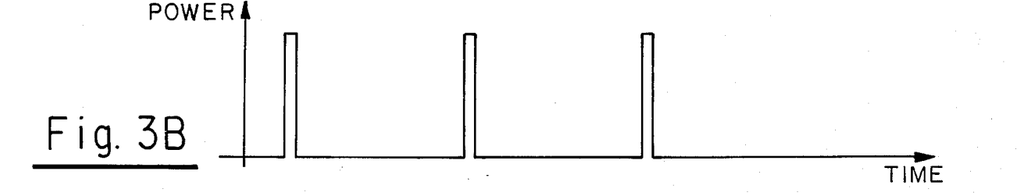
Figure 3C:
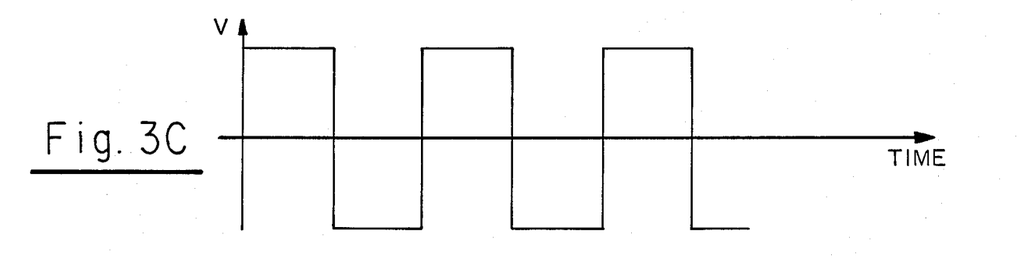
Figure 3D:
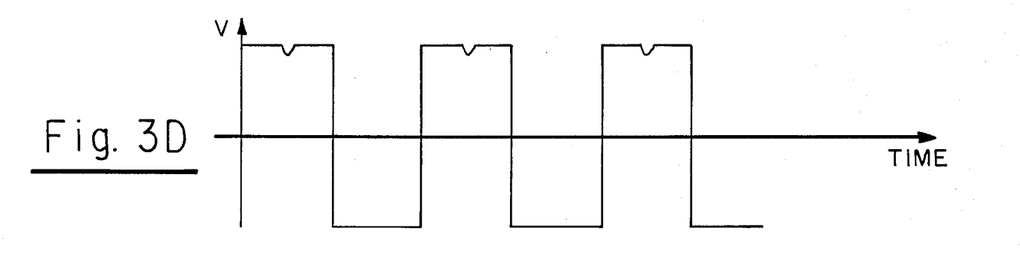
Figure 3E:
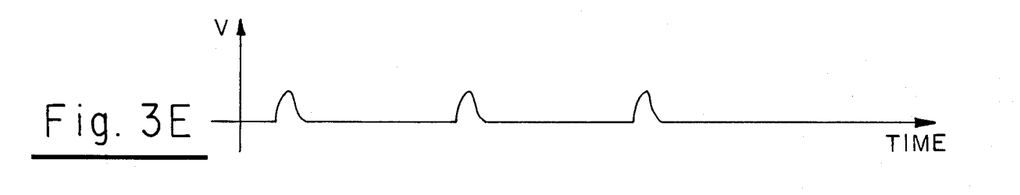

The downhole electronics, contained within the member 34 in the present embodiment, are shown in FIG. 2. The skid 37 has an insulating face 51, which may be formed of any suitable insulating material, such as rubber, a ceramic, etc. Mounted in the skid wall are a relatively widely spaced electrode pair 111, 112 and a relatively closely spaced electrode pair 121, 122. In the present embodiment, the electrodes are button electrodes. Centrally located between the electrode pairs is a microwave antenna 130. A power supply (not shown) energizes a magnetron 132 which produces microwave electromagnetic energy that is coupled by coaxial conductor 133 to antenna 130, which is a waveguide antenna in the present embodiment. A suitable matching coupler 134 can be utilized for coupling the microwave electromagnetic energy from the coxial conductor to the waveguide antenna. The waveguide antenna can be filled with a suitable dielectric material, as shown at 135. In the present embodiment, the microwave output is pulsed, this being achieved by enabling the magnetron with outputs of a pulse generator 137. The pulse generator is, in turn, controlled by the clocking circuitry of microprocessor 100, via delay 138.

The microwave electromagnetic energy is preferably in the approximate frequency range 1 GHz to 10 GHz. In general, lower frequencies will be less subject to attenuation by the formations, but will require larger components for generation and transmission. Thus, the frequency will typically be selected based on the desired heating characteristic, power considerations, and size considerations. The heated region of the formations, whose actual shape and extent will depend on factors such as the antenna configuration, the nature of the formations, and the frequency and power of the microwave energy, is illustrated in FIG. 2 by the region 199.

In the present embodiment, the microprocessor 100, which conventionally has memory, input/output, and suitable clock circuit capabilities, is provided as part of the downhole circuitry, but it will be understood that suitable alternatives, such as a special purpose processor or discrete circuitry, can be utilized in implementing the invention. The processor may be, for example, a Motorola 68000, in conjunction with suitable memory, input/output, and clock circuitry.

In the FIG. 2 embodiment, a current is passed between the outer electrode pair 111, 112 and the resultant voltages at inner electrodes 121, 122 are measured to determine the conductivity of the formations in the region of electrodes 121, 122, which includes the heated region 119. A square wave signal from the microprocessor clock circuitry is coupled to a current amplifier 143 and then to electrode 111, via a measuring resistor $R_m$. Current return is via electrode 112 and ground reference. The voltage across $R_m$ is amplified by voltage amplifier 144, and is indicative of the current in the circuit. This current reading is sent to the microprocessor 100. A voltage difference at the positions of electrodes 121 and 122 is indicative of a specific portion of the total voltage drop associated with the current flowing between electrodes 111 and 112. This portion of the voltage drop is indicative of the conductivity of the formations in the region 199. The electrodes 111 and 112 are respectively coupled to inputs of operational amplifiers 151 and 152, the outputs of which are respectively coupled to the inputs of a difference amplifier 155. The output of difference amplifier 155, designated $V_{out}$, is coupled to a transient digitizer 160 which receives gating and clocking signals from the microprocessor 100. The output of the digitizer is coupled to the microprocessor 100.

The output of difference amplifier 155 is also applied, as a negative feedback control signal, via low pass filter 156, to the circuit of operational amplifier 151. In particular, the fed back signal is applied to the gate electrode of field-effect transistor 157, the source electrode of which is coupled to the output of operational amplifier 151, and the drain electrode of which is coupled to the second input of operational amplifier 151 via an adjustable impedance $R_a$. The operational amplifier 152 has its second input coupled to ground reference potential, and can be provided with adjustability using feedback resistor $R_b$.

Referring to FIG. 3, there are shown characteristic waveforms of various signals, as a function of time, for the embodiment set forth. The graph 3A illustrates the current applied to electrodes 111, 112. An alternating current is preferable, in that it avoids deposition of ions at one of the electrodes. In the present embodiment, a square wave is used, but other wave shapes, such as a sinusoid, could also be utilized. A suitable frequency for this example is of the order of 100 Hz. The graph 3B shows the amplitude envelope of the microwave energy. The pulse duration, for this example, is about 0.1 usec., and the pulses are triggered to occur at about the center of the positive-going cycles of the outer electrode current, as determined by delay 138. The graphs 3C and 3D illustrate the nature of the voltage sensed at electrodes 121 and 122, respectively. The general shape of these waveforms track the current waveform of graph 3A, since the voltage drop is related to the current magnitude and polarity, as well as the impedance of the intervening formations. Since the formations do not change (for a tool which does not move substantially over the measurement time period, and excepting the effect of the heating pulses, to be described), the impedance will be substantially constant. The effect of the change in the conductivity of the heated region is seen in graph 3D as a decreased in measured voltage at electrode 122 (shown exaggerated for clarity), which results from the decrease in conductivity in the heated region 199. The graph 3E shows the signal $V_{out}$ which is output from difference amplifier 155; i.e., a signal which illustrates the change in conductivity, as a function of time, which results from the heating pulses.

As noted above, the shape and extent of the heated region will depend on factors such as the antenna configuration, the nature of the formations, and the frequency and power of the microwave energy, the power being a function of the amplitude and duty cycle of the pulse envelope. For practical power generation, the heating effect will only be large enough to cause a change in conductivity that is a few orders of magnitude less than the baseline conductivity. Although measurable, the effect is small enough that it is preferred to use a technique which assists in discriminating the signal from existing noise. In the present embodiment a series of successive signals $V_{out}$ from successive cycles are digitized and accumulated (by digitizer 160) to obtain a result having improved signal-to-noise ratio.

Figure 4:
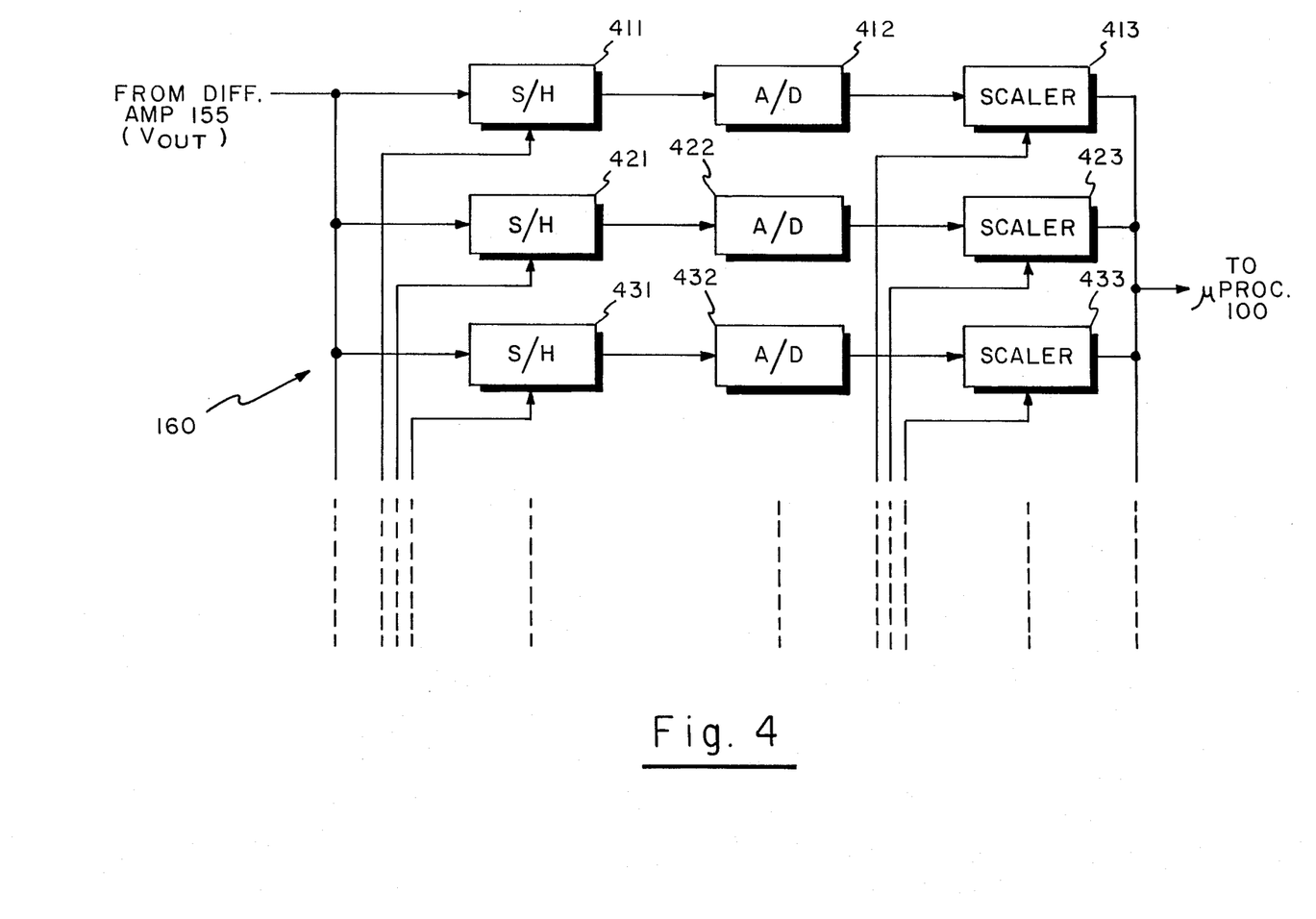
FIG. 4 is a block diagram of a digitizer of the type which can be utilized in the present embodiment.

FIG. 4 shows an embodiment of the digitizer 160 which can be utilized to sample, store, and accumulate the signals $V_{out}$, at high speed, to obtain an output signal that is averaged over a number of cycles for improved signal-to-noise ratio. Sample and hold circuits 411, 421, . . . are provided, and are sequentially gated by clock signals from microprocessor system 160. The outputs of the sample and hold circuits are respectively coupled to analog-to-digital converters 412, 422, . . . and scalers 413, 423, . . . In operation, the received voltage, $V_{out}$, is sampled, and successive samples are digitized and stored by the scalers 413, 423, . . . The scalers are operative to accumulate the digitized samples for a number of cycles and then, upon control of a signal from microprocessor 160, to sequentially read out the accumulated digital totals to the microprocessor 160. Digitizers of a form similar to the one illustrated in FIG. 4 are also available commercially in chip form, and alternative configurations which implement the function of sampling and accumulating the measured voltage can be utilized.

The information obtained and stored by the memory associated with microprocessor system 160 can be transmitted to the earth's surface through the armored cable 33. These signals, in digital form, can be communicated using well known techniques. Further processing, to be described hereinbelow, can be performed downhole before transmission to the surface, or uphole by computing subsystem 85, as desired.

Before further describing the technique of the present embodiment, the following theoretical explanation is set forth. Consider a porous medium, such as a rock matrix, saturated with salt water. The water temperature can be varied at a frequency $\omega$ by radiating the medium with microwave energy that is power modulated at a frequency $\omega$. The microwave energy will we preferentially absorbed by the water, rather than the matrix material. The conductivity of the water is temperature-dependent, so the water conductivity will also vary at frequency $\omega$. If the thermal wavelength $\delta$ is very small compared to the size of the pores in the medium, then the water temperature in the pores will oscillate with a relatively large amplitude, since the heat does not have a chance to escape the pores in that time. There will then be a corresponding relatively large signal at frequency $\omega$ for the measured conductivity. If, on the other hand, $\omega$ is relatively small, so that the thermal wavelength $\delta$ is much larger than the pore sizes, then the temperature rise will be smaller and the conductivity measured at frequency $\omega$ will be smaller as well. As the modulation frequency of the microwave power is varied so that the thermal wavelength, $\delta$, is varied from a size smaller than the characteristic dimension of a pore, d, to a size larger than d, the conductivity oscillations at frequency $\omega$ will also vary. The largest variation can be expected to occur at the frequency where $\delta$ approximately equals d. In a form of the present invention, the distribution of pore sizes is determined by measuring how the conductivity oscillations vary as a function of the power modulation frequency of the microwave energy.

The equation for motion of the temperature in the fluid is the heat equation in the fluid [equation (1)] and in the solid [equation (2)], as follows:

$$-k_f \nabla^2 T_f + c_f \frac{\partial T_f}{\partial t} = Q[1 + \cos(\omega t)] \quad (1)$$

$$x_s \nabla^2 T_s - c_s \frac{\partial T_s}{\partial t} = 0 \quad (2)$$

where Q is the thermal powerr absorbed by the fluid, $T_f$ and $T_s$ are temperature in the fluid and solid, respectively, $K_f$ and $K_s$ are the thermal conductivity of the fluid and solid, respectively, and $c_f$ and $c_s$ are the volumetric specific heat for the fluid and solid, respectively. It is assumed that the solid phase is substantially transparent to microwave energy, so the temperature in the solid is governed by the source-free heat equation. The microwave amplitude is assumed to be 100% modulated at a frequency $\omega/2\pi$. The amplitude of the heat source is related to the amplitude of the carrier wave and to the absorptive part of the dielectric constant at the carrier frequency. At the walls of the pore-grain interface, the boundary conditions are that the temperature is continuous, and that the component of the heat flux normal to the interface is continuous.

The effects of the two terms on the righthand side of equation (1) can be considered separately. Since the first term is independent of position and time, its effect is to raise continuously the temperature of the water and thereby the temperature of the solid phase, as well. This rise in temperature would continue until the flux of heat through the macroscopic boundaries of the sample balances the heat input, thus establishing a temperature profile which would be spatially uniform on the scale of the pore/grain sizes. The sinusoidal time dependence of the righthand side of equation (1) gives rise to a sinusoidal variation in the temperature $\Delta T$, which is not spatially homogeneous but which varies on a microscopic scale with the wave vector $$q_j = \sqrt{i\omega c_j/k_j} = (1+i)/\delta_j(\omega) \tag{3}$$

where $\delta_j(\omega)$ is the thermal wavelength in the medium j, and $k_j$ and $c_j$ are respectively the thermal conductivity and the volumetric specific heat for the medium j. The sinusoidal variation in the local temperature, $\Delta T_f$ gives rise to a sinusoidal variation in the local conductivity of the fluid $$\Delta \sigma_f = \frac{\partial \sigma_f}{\partial T} \Delta T_f \tag{4}$$

This, in turn, gives rise to a sinusoidal variation in the macroscopic conductivity of the composite media $$\Delta \sigma(\omega) = \frac{1}{F} \frac{\partial \sigma_f}{\partial T} \frac{iQ_o}{\omega c_f} \widetilde{R}(\omega) \tag{5}$$

In relationship (5), the term $iQ_o/\omega c_f$ represents the complex amplitude of the temperature change (for the fluid, which is assumed to be the only component absorbing energy) for heating of power $Q_o$ and an angular frequency $\omega = 2\pi f$. In accordance with (4) above, the term $\partial \sigma_f/\partial T$ converts the complex temperature amplitude change for the fluid into a complex conductivity change for the fluid. The term $1/F$ (where F is the formation factor $F = \sigma_f/\sigma$) converts the complex conductivity change for the fluid to the complex conductivity of the composite material (formation). The quantity $\widetilde{R}(\omega)$ is a dimensionless complex-valued function, of particular interest herein, which describes the frequency response of the system to the applied modulated heat source. This term reflects the microgeometry of the formation, and can be visualized as being a measure of the heat from the fluid leaking off into the solid matrix. Of greatest interest is the frequency range where the formation thermal wavelength $[\oplus(\omega)]$ is comparable to the sizes of the formation pores. It can be shown that:

$$\frac{\lim_{\omega \to o} \omega \Delta \sigma(\omega)}{\lim_{\omega \to \infty} \omega \Delta \sigma(\omega)} = \frac{\widetilde{R}(o)}{\widetilde{R}(\infty)} = \frac{C_\omega \phi}{C_\omega \phi + C_s(1-\phi)} \tag{6}$$

where $c_w$ and $c_s$ are the volumetric specific heat of the water and solid, respectively, and $\phi$ is the free water porosity. By measuring the ratio of $\omega \sigma(\omega)$ at low and high frequencies, one can be obtain the porosity if $c_s$ is known, or vice versa.

Figure 5:
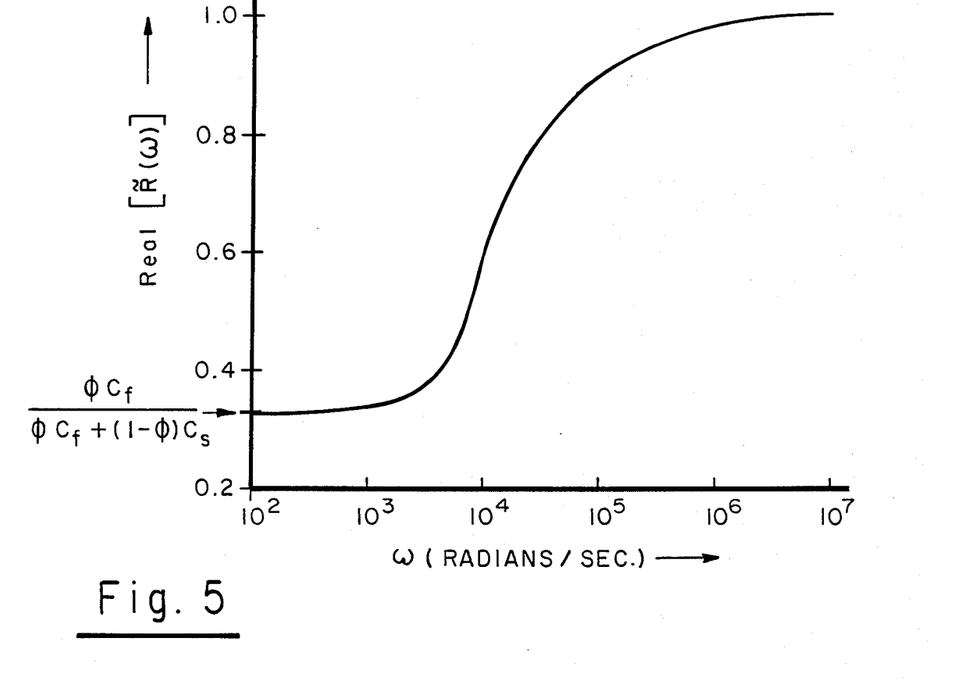
FIG. 5 shows an example of a plot of the real part of $\overline{R}(\omega)$ as a function of $\omega$.
Figure 6:
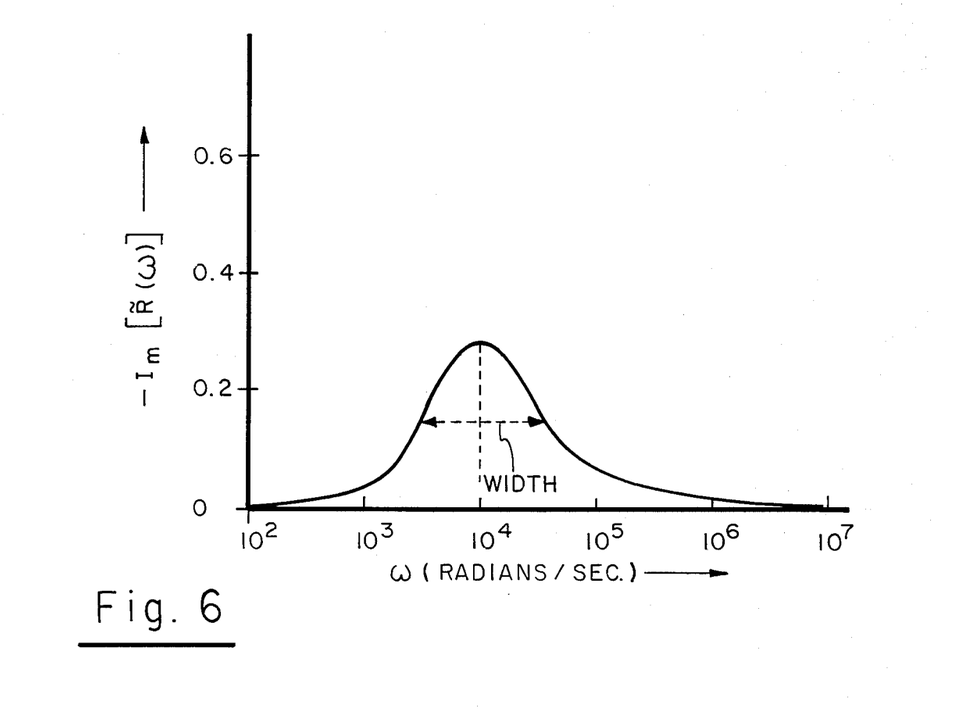
FIG. 6 shows an example of a plot of the imaginary part of $\overline{R}(\omega)$ as a function of $\omega$.

FIGS. 5 and 6 show an example of a plot of the real part (FIG. 5) and the imaginary part (FIG. 6) of $\widetilde{R}(\omega)$ as a function of $\omega$. As previously noted, at the low frequency limit, all of the heat radiated into the water has time to diffuse into the solid phase, and $$\lim_{\omega \to o} \widetilde{R}(\omega) = \frac{\phi C_\omega}{\phi C_\omega + (1-\phi)C_s} \tag{7}$$

At the high frequency limit, the heat does not have enough time to diffuse from the fluid into the solid except for a thin boundary layer near the walls of the pores. The high frequency asymptote of $\widetilde{R}(\omega)$ contains useful geometrical information. In particular:

$$\frac{\omega \Delta \sigma(\omega) - \lim_{\omega \to \infty} \omega \Delta \sigma(\omega)}{\lim_{\omega \to \infty} \omega \Delta \sigma(\omega)} = \frac{2}{iq\Lambda \left[ \sqrt{\frac{K_\omega C_\omega}{K_s C_s}} + 1 \right]} \tag{8}$$

where $$q_1 = \sqrt{\frac{i\omega C_\omega}{K_\omega}} \tag{9}$$

$k_w$ is the thermal conductivity of the water, and $\Lambda$ is a characteristic length scale related to the surface-to-volume ratio of the pores. [The length scale, $\Lambda$, is described, for example, in "New Pore-Size Parameter Characterizing Transport in Porous Media", D. L. Johnson, J. Koplik, and L. M. Schwartz, Phys. Rev. Lett. 57, 20 (1986).] The permeability, K, of the formation can then be obtained from $\Lambda$ using $$K = \frac{\Lambda^2}{8F}. \tag{10}$$

Figure 7:
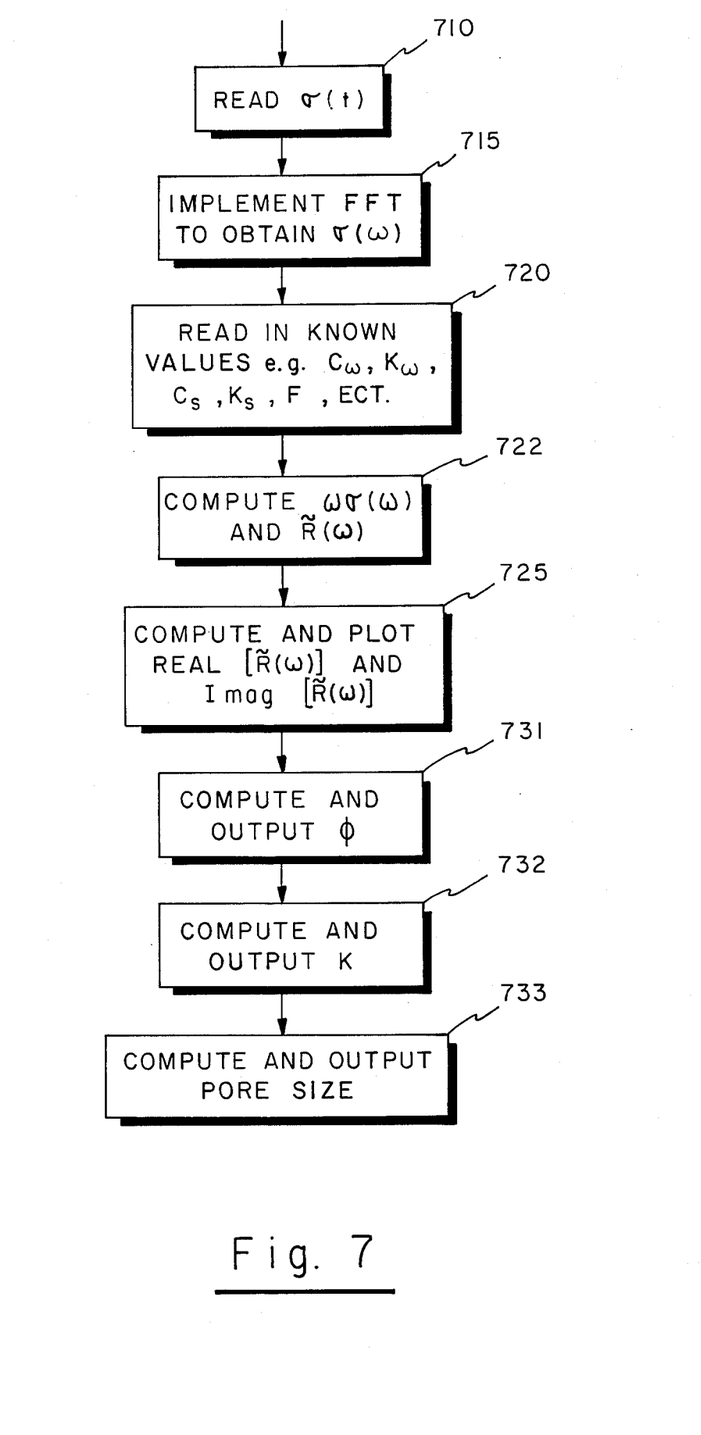
FIG. 7 is a flow diagram of routine for a processor for computing formation properties in accordance with an embodiment of the technique of the invention.

Referring to FIG. 7, there is shown a flow diagram of the routine for programming a processor, such as in the computing subsystem 85 in FIG. 1, a downhole processor, or a processor remote from the wellsite, to compute output values from the measured conductivity. The block 710 represents the reading in of $\sigma(t)$, which is the stored conductivity as a function of time. As was previously described, the digital values for $\sigma(t)$ are obtained from the output $V_{out}$, and stored. Conversion to the frequency domain is then implemented, using a Fast Fourier Transform ("FFT") to obtain $\sigma(\omega)$, as represented by the block 715. Both software routines and special chips are well known in the art for implementing the FFT function. The block 720 is then entered, this block representing the reading in of values that are either known or estimated, for example the thermal conductivity and the volumetric specific heat of the water and the solid, the formation factor, etc. Next, values of $\omega \sigma(\omega)$ and $\widetilde{R}(\omega)$ are computed consistent with relationship (5) (block 722). The Real and Imaginary parts of $\widetilde{R}(\omega)$ can then be computed, and these values can also be plotted, if desired (block 725).

A number of output parameters can then obtained from $\widetilde{R}(\omega)$ graphically or numerically (blocks 731, 732 and 733). For example, as seen from relationship (7), and in the graph of FIG. 5, the low frequency limit of the Real part of $\widetilde{R}(\omega)$ can be used to solve for porosity, $\phi$, when the volumetric specific heat of the fluid and the solid are known (or can be approximated). Permeability can be obtained using relationships (8), (9), and (10). In particular, the high frequency limit of $\omega \sigma(\omega)$ is obtained, and equations (8) and (9) are used to solve for $\Lambda$ at a given value of $\omega$ near the high frequency limit. Equation (10) can then be used to compute the permeability K.

The behavior of $\text{Imag}[R(\omega)]$ is useful in determining the characteristic pore dimensions in the measured region. In FIG. 6, for example, the angular frequency $\omega$ at the peak of $\text{Image}[\widetilde{R}(\omega)]$ (which is at about $w=10^4$) is indicative of the dominant pore dimension in the measured region of the formations. The length scale varies as $\sqrt{k_w/\omega c_w}$. As $\omega$ is varied from $10^6\text{ sec}^{-1}$ to $1\text{ sec}^{-1}$, the corresponding pore dimension will vary between about 1 micrometer and 1 mm. The width of the peak of $\text{Imag}[\widetilde{R}(\omega)]$ is indicative of the distribution of pore sizes.

The invention has been described with reference to a particular preferred embodiment, but variations within the spirit and scope of the invention will occur to those skilled in the art. For example, while well logging is a particularly advantageous use of the technique set forth, it will be understood that the measurements hereof can be made on porous media in the other environments including, but not limited to, study of core samples. In such case, the electrodes may, for example, be applied directly to the medium being measured. Various alternative methods of implementing the selective heating and the measurement of conductivity can also be utilized. Finally, other electrical characteristics which depend on temperature can also be measured to determine thermal behavior.

We claim:

1. A method for investigating earth formations surrounding a borehole, comprising the steps of:
   heating a region of the formations by transmitting a pulse of microwave electromagnetic energy into the formations;
   measuring the change in the conductivity of the heated region in response to said pulse; and
   determining a property of the region from the measured conductivity change.

2. The method as defined by claim 1, wherein said step of transmitting a pulse of microwave electromagnetic energy into the formations comprises transmitting a pulse having a duration of less than a microsecond.

3. The method as defined by claim 2, wherein said pulse has a duration of about 0.1 microsecond.

4. The method as defined by claim 3, wherein said measuring step comprises measuring the instantaneous conductivity response to said pulse.

5. The method as defined by claim 2, wherein said step of determining the change in conductivity includes measuring the conductivity of said region of the formation as a function of time.

6. The method as defined by claim 5, wherein said step of measuring the change in conductivity further includes transforming said conductivity as a function of time to conductivity as a function of thermal frequency.

7. The method as defined by claim 2, further comprising the step of determining the free water porosity of said region of the formations from the measured change in conductivity.

8. The method as defined by claim 2, further comprising the step of determining a property of the microgeometry of said region of the formations from the measured change in conductivity.

9. The method as defined by claim 2, further comprising the step of determining the permeability of said region of the formations from the measured change in conductivity.

10. The method as defined by claim 2, wherein said measuring step comprises measuring the instantaneous conductivity response to said pulse.

11. The method as defined by claim 2, further comprising transmitting a series of said pulses into the formations, measuring the change in the conductivity of the heated region in response to each pulse, and determining said property of said region from the measured conductivity changes.

12. The method as defined by claim 1, further comprising transmitting a series of said pulses into the formations, measuring the change in the conductivity of the heated region in response to each pulse, and determining said property of said region from the measured conductivity changes.

13. The method as defined by claim 1, wherein said step of determining the change in conductivity includes measuring the conductivity of said region of the formation as a function of time.

14. The method as defined by claim 13, wherein said step of measuring the change in conductivity further includes transforming said conductivity as a function of time to conductivity as a function of frequency.

15. The method as defined by claim 1, wherein said measuring step comprises measuring the instantaneous conductivity response to said pulse.

16. The method as defined by claim 1, further comprising the step of determining the free water porosity of said region of the formations from the measured change in conductivity.

17. The method as defined by claim 1, further comprising the step of determining a property of the microgeometry of said region of the formations from the measured change in conductivity.

18. The method as defined by claim 1, further comprising the step of determining the permeability of said region of the formations from the measured change in conductivity.

19. Apparatus for determining a microgeometry property of formations surrounding a borehole, comprising:
   a logging device movable through the borehole;
   means in said logging device for transmitting a pulse of energy into a region of said formations to selectively heat said region;
   means in said logging device for measuring the instantaneous change in conductivity of said region resulting from said selective heating; and
   means for determining a property of said region from the measured change in conductivity.

20. Apparatus as defined by claim 19, wherein said means for heating the formations comprises a microwave transmitter operative to transmit pulses of microwave energy.

21. Apparatus as defined by claim 20, wherein said means for measuring the change in conductivity comprises:
   means for causing an electrical current to flow through said region; and
   means for measuring voltage changes across said region as a function of time.

22. Apparatus as defined by claim 21, further comprising means for accumulating conductivity measurements of said region associated with a series of said transmitted pulses of microwave energy.

23. Apparatus as defined by claim 19, wherein said means for measuring the change in conductivity comprises:
   means for causing an electrical current to flow through said region; and means for measuring voltage changes across said region as a function of time.

24. Apparatus as defined by claim 19, wherein said means for measuring the change in conductivity of said region includes means for measuring the change in said conductivity as a function of time, and further comprising:
   means for transforming the measured conductivity as a function of time to conductivity as a function of thermal frequency; and
   means for determining said property from said conductivity as a function of thermal frequency.

25. Apparatus as defined by claim 24, wherein said means for determining said property from said conductivity as a function of frequency includes means for determining an indication of the characteristic length scales of the pores in said region.

26. A method for determining microgeometric properties of a porous medium, comprising the steps of:
   heating the medium with a series of pulses of microwave electromagnetic energy;
   measuring the conductivity response of the medium instantaneously after said heating pulses;
   transforming the measured conductivity responses to conductivity as a function of thermal frequency; and
   determining said property of said medium from said conductivity as a function of thermal frequency.

27. The method as defined by claim 26, wherein said step of determining said property comprises determining an indication of the pore sizes of said medium.

28. The method as defined by claim 26, wherein said step of determining said property comprises determining an indication of the pore size distribution of said medium.

29. The method as defined by claim 26, wherein said pulses have a duration of less than a microsecond.

30. A method for determining an indication of the pore sizes in formation surrounding a borehole, comprising the steps of:
   heating a region of the formations with microwave electromagnetic energy;
   measuring the thermal frequency response of the conductivity of said region; and
   determining said indication of pore sizes in said region from said thermal frequency response.

31. The method as defined by claim 30, wherein said heating is performed by transmitting a pulse of microwave electromagnetic energy into said region of the formations.

32. The method as defined by claim 31, wherein said pulse has a duration of less than a microsecond.

33. The method as defined by claim 32, wherein said measuring step comprises measuring the instantaneous response to said pulse.

34. The method as defined by claim 33, wherein said measuring step comprises measuring the instantaneous conductivity response to said pulse as a function of time and transforming said function of time to a function of thermal frequency.

35. The method as defined by claim 31, wherein said measuring step comprises measuring the instantaneous response to said pulse.

36. The method as defined by claim 35, wherein said measuring step comprises measuring the instantaneous conductivity response to said pulse as a function of time, and transforming said function of time to a function of thermal frequency.

37. The method as defined by claim 31, further comprising transmitting a series of said pulses into the formations, measuring the thermal frequency response of the conductivity of said region for said pulses, and accumulating said thermal frequency responses.

38. The method as defined by claim 30, wherein said step of determining an indication of pore sizes from said thermal frequency response comprises determining an indication of the pore size distribution in said region.

39. The method as defined by claim 30, further comprising the step of determining the permeability in said region from said indication of pore sizes in said region.

* * * * *

UNITED STATES PATENT AND TRADEMARK OFFICE
CERTIFICATE OF CORRECTION

PATENT NO. : 4,855,912

DATED : August 8, 1989

INVENTOR(S) : Banavar et al.

Page 1 of 2

It is certified that error appears in the above-identified patent and that said Letters Patent is hereby corrected as shown below:

In the Drawings

Fig. 7, amend $C_\omega$, $K_\omega$, $C_S$, $K_S$ to read -- $c_f$, $k_f$, $c_S$, $k_S$ --.

col. 2, line 6, amend formations to read -- formation --.

col. 2, line 25, amend we to read -- be --.

col. 2, line 51, amend hereof to read -- thereof --.

col. 3, line 48, amend cn to read -- can --.

col. 6, line 45, amend $x_S$ to read -- $k_S$ --.

col. 6, line 47, amend powerr to read -- power --.

col. 6, line 49, amend $K_f$ and $K_S$ to read -- $k_f$ and $k_S$ --.

col. 7, line 51, amend $[\theta(\omega)]$ to read -- $[\delta(\omega)]$ --.

col. 7, line 55, amend $C_\omega$ to read -- $c_f$ --.

col. 7, line 56, amend $C_\omega$ to read -- $c_f$ -- and amend $C_S$ to read -- $c_S$ --.

col. 7, line 58, amend $c_w$ to read -- $c_f$ --.

col. 7, line 61, amend $\omega\sigma(\omega)$ to read -- $\omega\Delta\sigma(\omega)$ --.

UNITED STATES PATENT AND TRADEMARK OFFICE
CERTIFICATE OF CORRECTION

PATENT NO. : 4,855,912

DATED : August 8, 1989

INVENTOR(S) : Banavar et al.

Page 2 of 2

It is certified that error appears in the above-identified patent and that said Letters Patent is hereby corrected as shown below:

col. 8, line 2, amend $C_\omega$ to read -- $c_f$ --.

col. 8, line 3, amend $C_\omega$ to read -- $c_f$ -- and amend $C_S$ to read -- $c_s$ --.

col. 8, line 13, amend $K_\omega C_\omega$ to read -- $k_f c_f$ --.

col. 8, line 14, amend $K_S C_S$ to read -- $k_s c_s$ --.

col. 8, line 18 and line 19, amend $C_\omega$ and $K_\omega$ to read -- $c_f$ and $k_f$ -- and following q, delete 1.

col. 8, line 21, amend $k_w$ to read -- $k_f$ --.

col. 9, line 4, amend $w = 10^4$ to read -- $\omega = 10^4$ --.

col. 9, line 7, amend $k_w/\omega c_w$ to read -- $k_f/\omega c_f$ --.

Signed and Sealed this

Fourteenth Day of January, 1992

Attest:

HARRY F. MANBECK, JR.

*Attesting Officer*  *Commissioner of Patents and Trademarks*